(12) United States Patent
Jordan, Jr.

(10) Patent No.: US 7,953,394 B2
(45) Date of Patent: *May 31, 2011

(54) REMOTE ELECTRONIC MAILBOX ACCESS

(75) Inventor: Royce D. Jordan, Jr., Lawrenceville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 23 days.

This patent is subject to a terminal disclaimer.

(21) Appl. No.: 12/473,251

(22) Filed: May 27, 2009

(65) Prior Publication Data

US 2009/0259726 A1    Oct. 15, 2009

Related U.S. Application Data

(63) Continuation of application No. 11/615,869, filed on Dec. 22, 2006, now Pat. No. 7,561,868, which is a continuation of application No. 10/097,279, filed on Mar. 14, 2002, now Pat. No. 7,194,252.

(60) Provisional application No. 60/341,156, filed on Dec. 13, 2001.

(51) Int. Cl.
*H04M 1/66* (2006.01)
*H04M 3/00* (2006.01)
*H04M 1/663* (2006.01)
*H04L 29/06* (2006.01)
*G06F 15/16* (2006.01)
*H04M 11/00* (2006.01)
*H04M 1/00* (2006.01)

(52) U.S. Cl. ............... 455/412.2; 455/406; 455/411; 455/414.3; 455/420; 455/556.2; 709/206; 709/218; 709/219

(58) Field of Classification Search ............... 455/412.1, 455/414.4, 406, 411, 412.2, 414.3, 420, 556.2; 709/206, 218, 219
See application file for complete search history.

(56) References Cited

U.S. PATENT DOCUMENTS

| | | | | |
|---|---|---|---|---|
| 5,706,211 | A * | 1/1998 | Beletic et al. | 709/206 |
| 6,560,456 | B1 * | 5/2003 | Lohtia et al. | 455/445 |
| 6,925,307 | B1 * | 8/2005 | Mamdani et al. | 455/466 |
| 7,035,904 | B1 * | 4/2006 | Jordan, Jr. | 709/206 |
| 7,107,042 | B1 * | 9/2006 | Jordan, Jr. | 455/412.1 |
| 7,117,248 | B1 * | 10/2006 | Jordan, Jr. | 709/206 |
| 2003/0050046 | A1 * | 3/2003 | Conneely et al. | 455/412 |
| 2003/0061288 | A1 * | 3/2003 | Brown et al. | 709/206 |
| 2006/0234681 | A1 * | 10/2006 | Bibr et al. | 455/412.1 |
| 2007/0243876 | A1 * | 10/2007 | Duan | 455/445 |
| 2009/0172077 | A1 * | 7/2009 | Roxburgh et al. | 709/202 |
| 2009/0203389 | A1 * | 8/2009 | Bhat | 455/466 |
| 2009/0265763 | A1 * | 10/2009 | Davies et al. | 726/3 |
| 2010/0011078 | A1 * | 1/2010 | Shkolnikov et al. | 709/206 |
| 2010/0169500 | A1 * | 7/2010 | Quigley et al. | 709/229 |
| 2010/0195606 | A1 * | 8/2010 | Kim et al. | 370/329 |
| 2010/0265939 | A1 * | 10/2010 | Parlamas et al. | 370/352 |

* cited by examiner

*Primary Examiner* — Lisa Hashem

(57) ABSTRACT

An apparatus for retrieving electronic mail messages via a wireless network. The apparatus comprises a gateway for sending an electronic mail retrieval reply message to a wireless device in response to receiving an electronic mail retrieval request message from the wireless device. The apparatus further comprises an application module. The application module has computer readable instructions. The computer readable instructions convert the retrieval request message into a format capable of transmission over an external computer network and the computer readable instructions convert the retrieval reply message into a format capable of transmission over a wireless network.

15 Claims, 6 Drawing Sheets

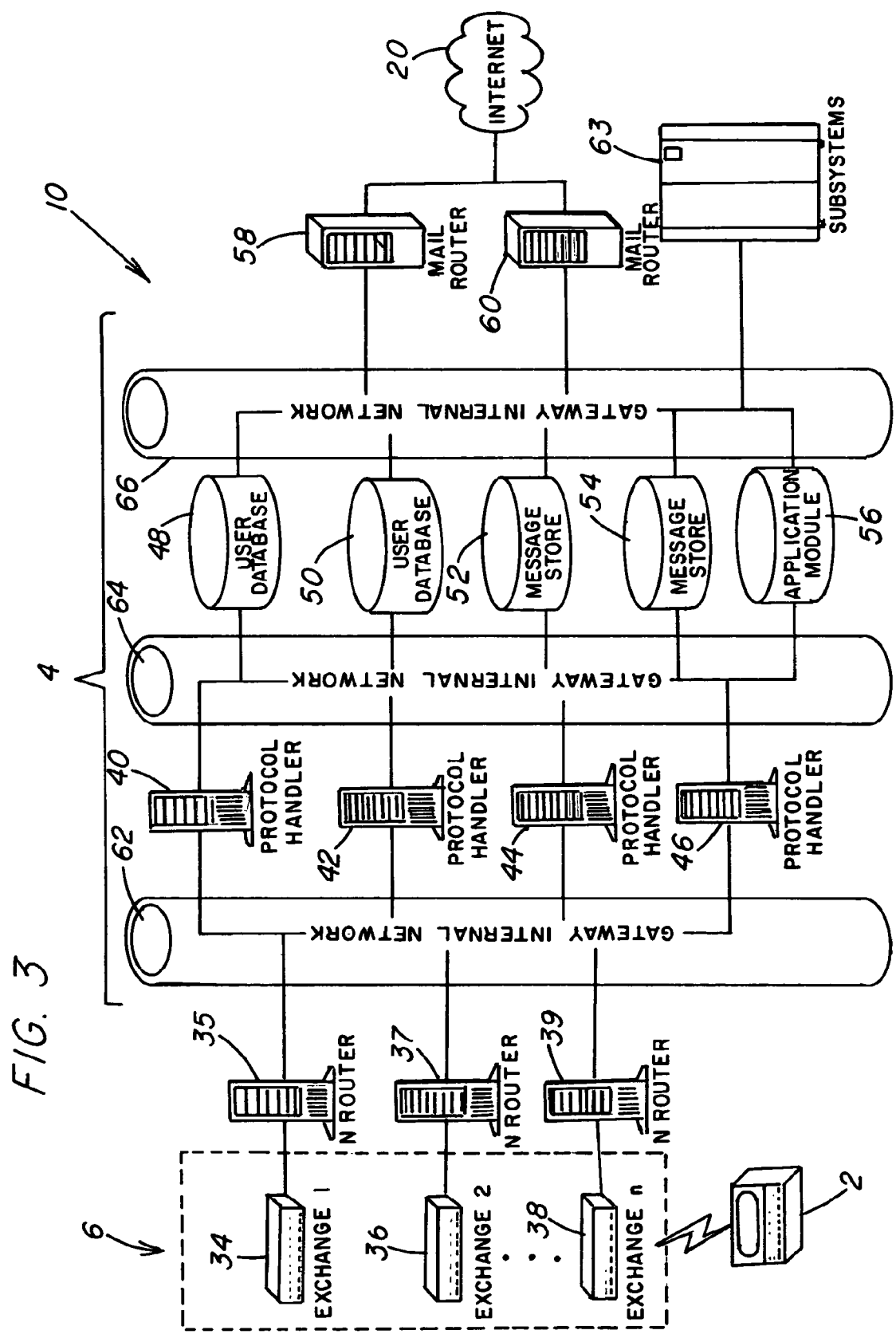

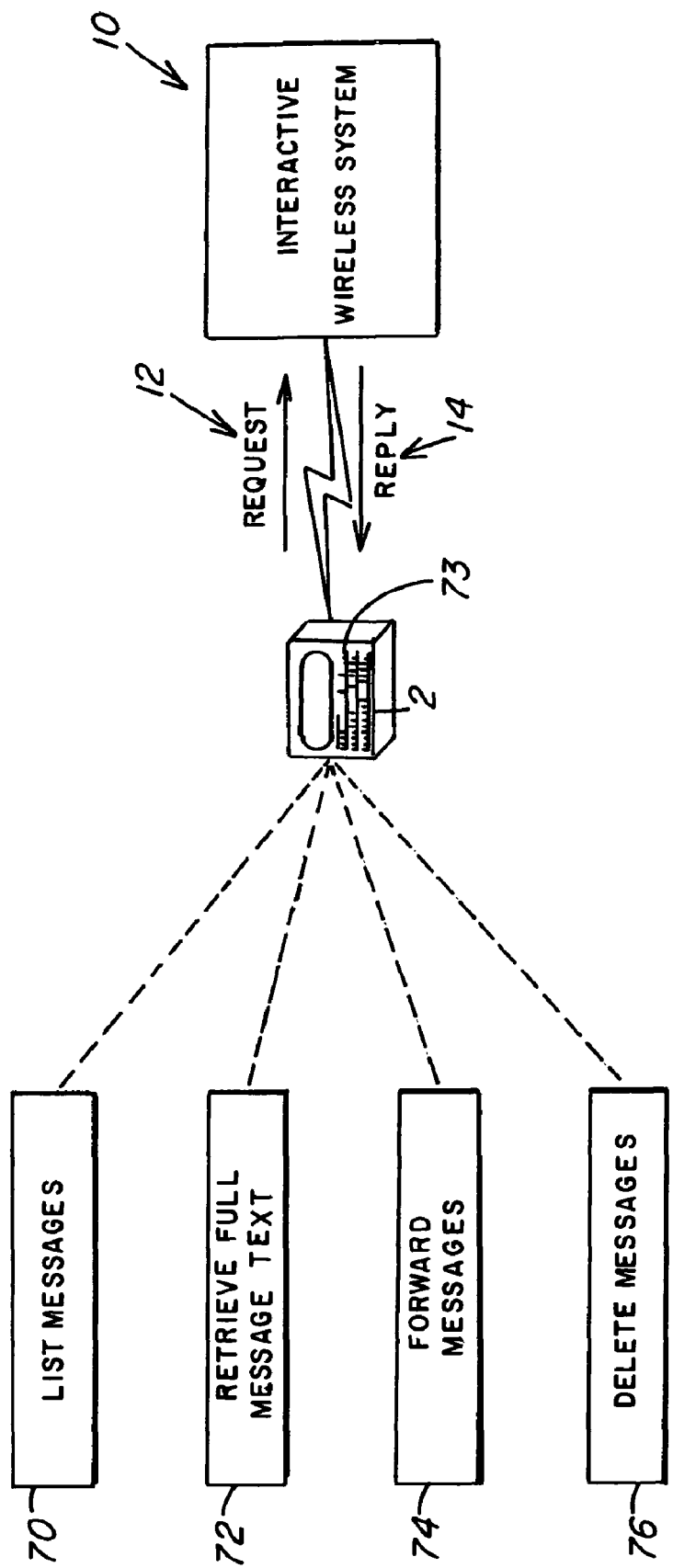

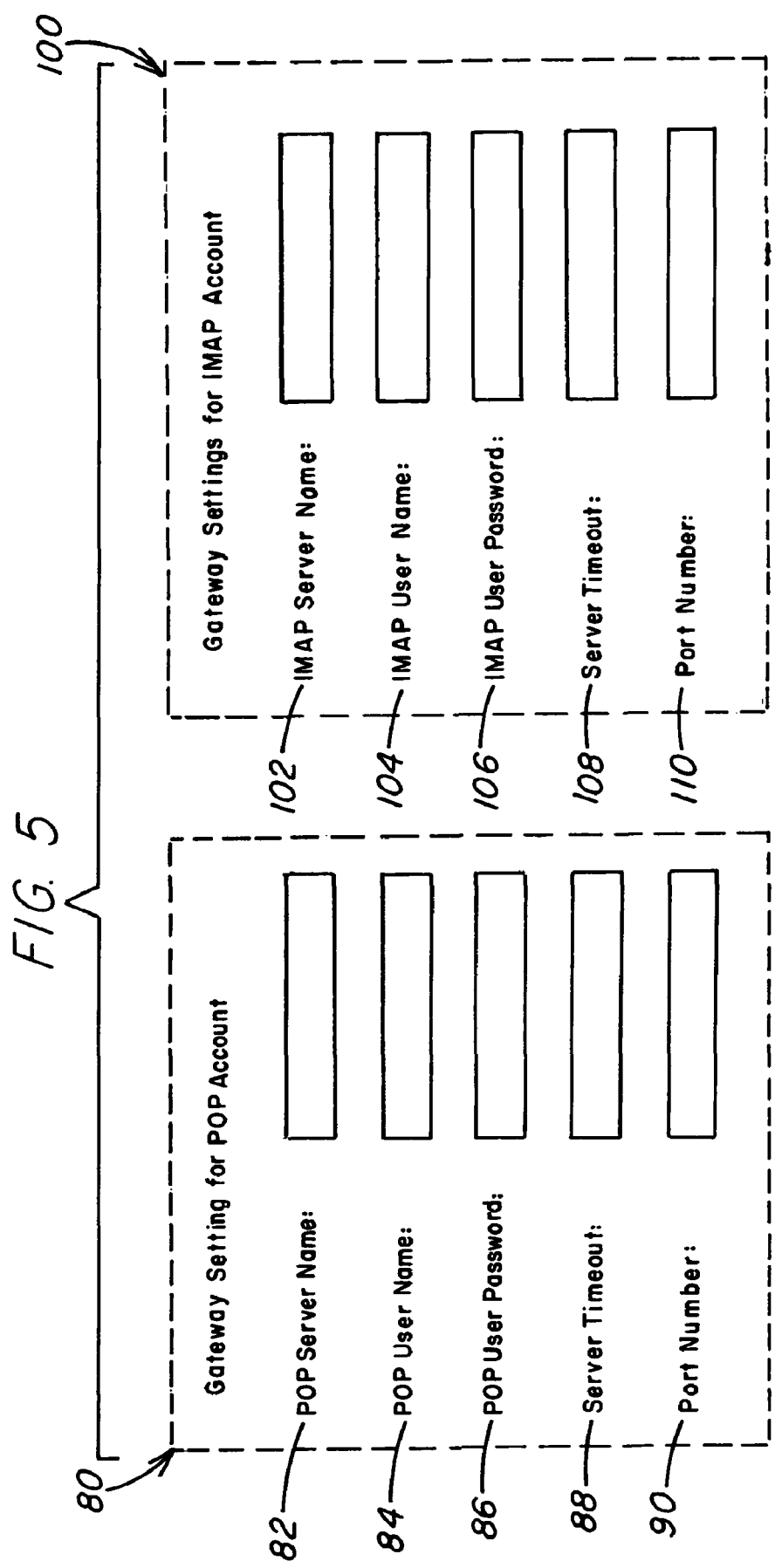

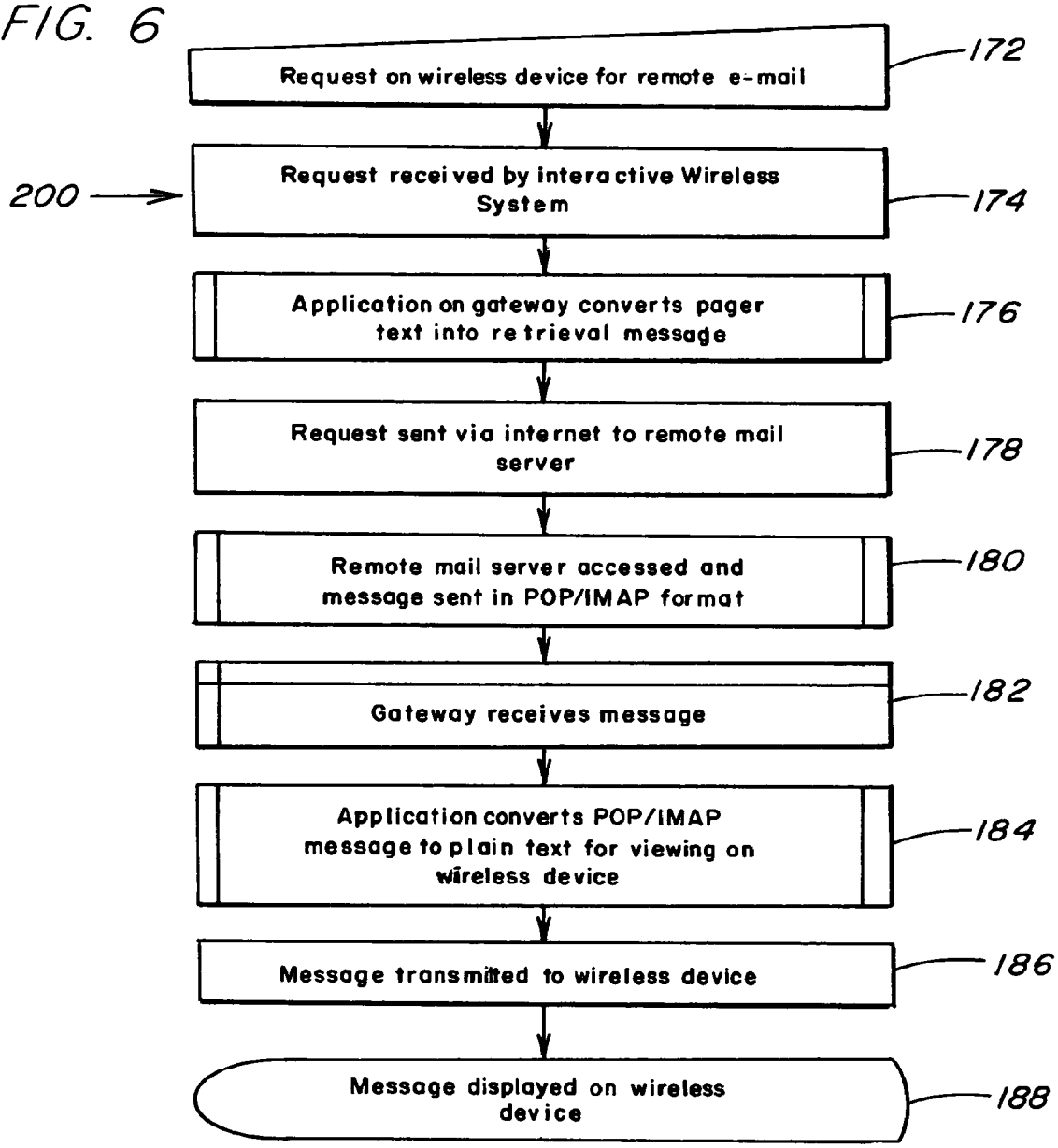

REMOTE ELECTRONIC MAILBOX ACCESS

CROSS REFERENCE TO RELATED APPLICATION

This application is a continuation of U.S. patent application Ser. No. 11/615,869 filed on Dec. 22, 2006 now U.S. Pat. No. 7,561,868. U.S. patent application Ser. No. 11/615,869, in turn, is a continuation of U.S. patent application Ser. No. 10/097,279, filed on Mar. 14, 2002 (now issued as U.S. Pat. No. 7,194,252) which claims priority to U.S. Provisional Application Ser. No. 60/341,156, filed on Dec. 13, 2001. The disclosures of the aforementioned applications are hereby incorporated herein, in their entirety, by reference.

BACKGROUND

This invention relates to an interactive wireless network and, in particular, to processing electronic mail (e-mail) over an interactive network.

Checking e-mail currently requires a client computer or device that can accommodate standard Internet e-mail protocols such as POP3 or IMAP where the client computer or device is in communication with an e-mail server provided by an Internet Service Provider (ISP) or through a Local Area Network (LAN) or Wide Area Network (WAN). There are currently no services that provide a means for checking an e-mail account on a remote e-mail server such as an AOL account, Yahoo mail account or Hotmail account, from a non e-mail protocol-enabled device over a wireless network without requiring specialized applications and integration. Therefore, there is a need in the art to provide a wireless e-mail access service that operates over an interactive wireless network that allows wireless users to obtain e-mail from their personal e-mail account via an interactive message without requiring specialized application development for a wireless device.

SUMMARY

According to one aspect, an embodiment of the present invention provides an apparatus for retrieving remote electronic mail messages over a wireless network. The apparatus includes a gateway for sending an electronic mail retrieval reply message to a wireless device in response to receiving an electronic mail retrieval request message from the wireless device.

According to another aspect, an embodiment of the present invention provides a method of retrieving electronic mail messages over a wireless network. The method includes sending a first electronic mail retrieval message to a gateway from a wireless device. The method further includes sending a second electronic mail retrieval message from the gateway over an external network in communication with the gateway. The gateway then receives a first electronic mail retrieval request reply message from the external network and sends a second electronic mail retrieval request reply message from the gateway to the wireless device.

According to yet another aspect, an embodiment of the present invention provides an apparatus for retrieving remote electronic mail messages over a wireless network, where the apparatus includes a gateway for sending an electronic mail retrieval reply message to a wireless device in response to receiving an electronic mail retrieval request message from the wireless device. The gateway is in communication with the Internet and the Internet is in communication with a remote electronic mail server. The apparatus includes an application module for converting the electronic mail retrieval request message to a format capable of transmission over the Internet, and the application module is further capable of converting the electronic mail retrieval reply message to a format capable of transmission over a wireless network to the wireless device.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of an apparatus, system and method in accordance with embodiments the present invention.

BRIEF DESCRIPTION OF THE DRAWINGS

FIG. 3 is a schematic drawing of one embodiment of an interactive wireless gateway according to one embodiment of the present invention;

FIG. 4 is a block diagram of a representation of message handling functions on a wireless device according to one embodiment of the present invention;

FIG. 5 is a representation of a configuration screen for a wireless gateway for sending and receiving e-mail to a wireless device according to one embodiment of the present invention; and FIG. 6 is a flow diagram showing one embodiment of an implementation of a remote e-mail retrieval and conversion feature of the present invention.

DETAILED DESCRIPTION OF THE INVENTION

In one embodiment, the present invention relates to a system and method for providing e-mail messages from a variety of locations over an interactive wireless network. The system interfaces with a two-way wireless device. The wireless device communicates with an interactive wireless communications system. In one embodiment, the wireless device transmits a request for e-mail messages stored on an e-mail server over a wireless network to a gateway. In one embodiment, the request is converted by the gateway to a standard format that is capable of recognition by an e-mail server, Simple Mail Transport Protocol (SMTP), for example. SMTP uses an envelope and body metaphor to structure e-mail transfer. The envelope is used to transfer messages and contains information about the message sender and the destination address. The originating address is used to notify the sender of the message when a delivery failure occurs. The SMTP body contains the entire message, including body and header information.

The request is sent from the gateway, functioning as an e-mail client for the particular wireless user, to the e-mail server, where the message contains the requester's username and password for the particular mail server. In one embodiment, the mail server sends the requested messages back to the gateway via the Internet in Post Office Protocol (POP) or Internet Message Access Protocol (IMAP) format. The gateway then converts the messages into a format readable by a wireless device and transmits the message to the wireless device.

In one embodiment, information from the wireless device is communicated to a wireless network, the one or more gateways, and the external network, such as the Internet. A gateway allows different systems, e.g., the Internet or other wide area networks and the wireless network to communicate with each other. In one embodiment, the gateway functions as an interface between a wireless device such as an interactive pager and the Internet.

In one embodiment, the interactive wireless device is an interactive pager and accepts message requests, including a username and a password, from an integral keyboard. In another embodiment, the wireless device user configures the gateway with the user's e-mail username and password through an Internet web browser to automatically, at user-defined intervals, poll a designated e-mail server or servers for new mail. The gateway in turn sends any unread messages to the wireless device in the form of a message. In yet another embodiment, the wireless device user initiates a request from the wireless device. The request may contain the name of the remote mail server and the user's username and password. In some embodiments, the gateway converts this request to a format capable of transmission over the Internet to the remote mail server.

Figure 1:
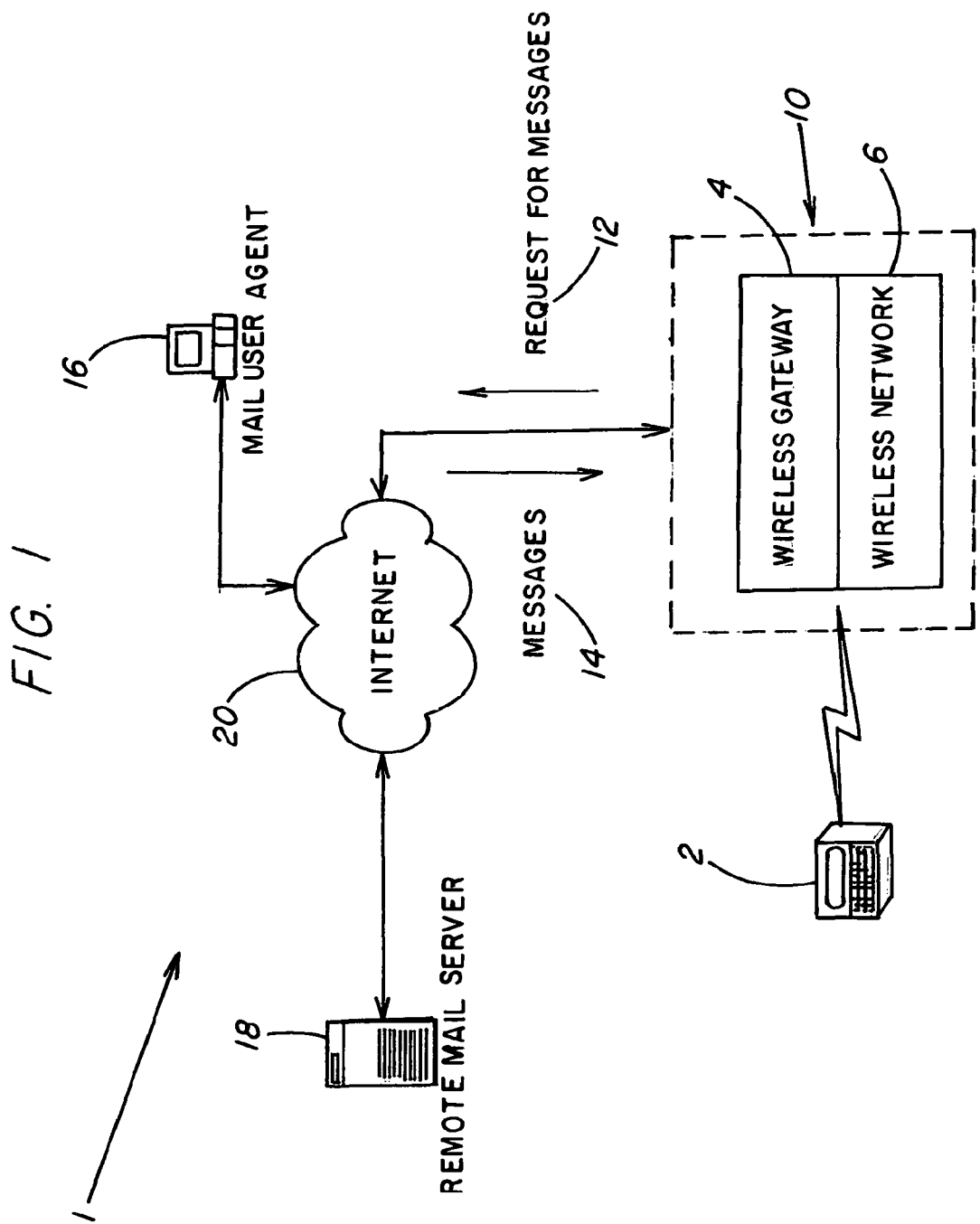
FIG. 1 is a schematic drawing of one embodiment of an interactive wireless system according to the present invention.

FIG. 1 illustrates one embodiment of the components of a system 1 according to the present invention. A wireless device 2, such as a two-way pager, communicates with an interactive wireless system 10. The wireless network 6 communicates with the wireless gateway 4. The wireless gateway 4, functioning as an e-mail client for an e-mail account of a user of the wireless device 2, processes incoming and outgoing e-mail messages from wireless devices communicating with the wireless network 10. The gateway 4 communicates with a network such as the Internet 20 for transmission and reception of e-mail messages from a designated remote mail server 18.

In one embodiment, a mail user agent (MUA) 16 sends e-mail messages via the Internet 20 to the wireless device user's e-mail account located on remote mail server 18. The e-mail messages reside on the mail server 18 until, in one embodiment, a request 12 is sent from the wireless gateway 4 to retrieve the messages residing on server 18. Mail sent from the MUA 16 may be in, for example, SMTP format and the message list 14 in reply to the request 12 may be in, for example, POP or IMAP format.

In response to request 12, all new e-mail messages residing on server 18 are sent, in one embodiment, via the Internet 20 to the gateway 4. The gateway 4, in one embodiment, converts the messages into a format capable of transmission over wireless network 6 and reception on wireless device 2.

Figure 2:
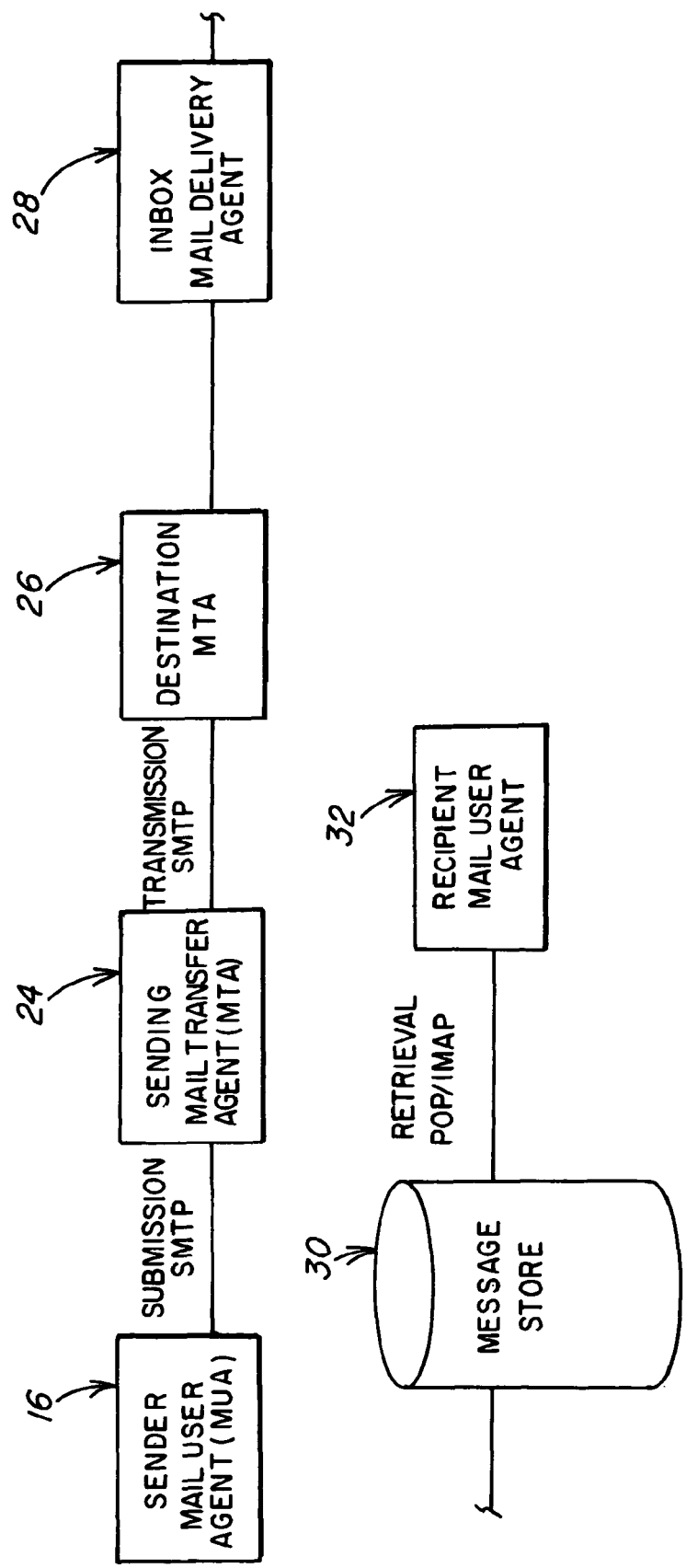
FIG. 2 is a block diagram of a representation of transmission and reception of an e-mail message.

FIG. 2 is a block diagram of an embodiment of a representation of transmission and reception of an e-mail message. In one embodiment of the invention, a sender composes and transmits an e-mail message on, for example, a local personal computer via a MUA 16 or mail client, as is known in the art. MUA or mail client examples include Microsoft Outlook® and Outlook Express, Netscape Mail™, and Lotus Notes®. The mail client or MUA 16 transmits the message to a sending mail transfer agent (MTA) 24 in a mail transmission format such as SMTP. The e-mail message is then routed via an internetwork of MTA's (e.g., the Internet 20 (not shown) to a destination MTA 26 which, in one embodiment, is the recipient's remote e-mail server. The destination MTA 26 delivers the message to the recipient's e-mail inbox via an inbox mail delivery agent (MDA) 28. The message is then placed in a message store 30 until it is accessed by the recipient MUA 32. The message is transferred to the recipient MUA 32 in, for example, POP or IMAP format. In one embodiment, the gateway 4 functions as the recipient MUA to retrieve messages.

The POP or IMAP formats may be used because some e-mail recipients may not have permanent connections to the Internet 20 necessary for receiving SMTP messages directly. Historically, users would dial into such a permanently connected machine to read their e-mail remotely. Such a permanently-connected machine or mail server would remain continuously connected to the Internet, thereby allowing it to receive e-mail continuously. With the proliferation of personal computing, there is an increased demand for e-mail to be stored locally, with only sporadic connections to the Internet. The POP and IMAP formats were developed to allow Internet users to retrieve mail from a remote mailbox via the user's MUA, thus allowing mail to be read and stored on a local POP or IMAP capable device communicating with the Internet 20.

FIG. 3 is a schematic drawing of one embodiment of an interactive wireless system 10 according to the present invention. A wireless device 2 such as a pager communicates with the wireless communication network 6. An example of the wireless communications network 6 uses the MOBITEX® technology of the Cingular Interactive Intelligent Wireless Network service provided by Cingular Wireless. The features of the present invention may be implemented, e.g., by the Cingular Wireless IM+ Interactive Messaging Service.

The MOBITEX® network is a two-way wireless data service that can be connected with other complementary networks. A wireless data service such as the MOBITEX® network includes a hierarchy of communications systems that can provide nationwide wireless service through a network of base stations and local switches under the control of higher order regional switches or exchanges. The wireless device 2 may operate with a wireless communications system using an over-the-air protocol such as HP98 or the Blackberry protocol developed by RIM (Research in Motion).

In one embodiment, the wireless device 2 is a wireless interactive pager capable of interactive messaging between the device and the wireless communication network 6. In other embodiments, the wireless device 2 can include, for example, a Personal Digital Assistant (PDA), a wireless telephone, a wireless personal computer, a wireless modem or any wireless device that is adapted to communicate with the wireless network 6. Interactive messaging provides, for example, a way of communicating with the ability of sending and receiving text messages. In one embodiment, the interactive pager displays the user's messages from various e-mail servers on a screen.

The gateway 4 processes data received, e.g., from the Internet 20 for use in wireless communication network 6. The components of gateway 4 may be connected over an internal network 62, 64, 66, which may be a local area network (LAN). One or more wireless network exchanges such as MOBITEX® regional switches 34, 36, 38, which may be at separate locations, communicate with gateway 4 through Nrouters 35, 37, 39. The communication between regional switches 34, 36, 38 and Nrouters 35, 37, 39 may use an X.25 protocol. Up to two dual-ported connectivity cards, e.g., those manufactured by Eicon Networks, can be placed in each Nrouter, permitting a total of four Fast-Sequenced Transport (FST) connections per Nrouter. Gateway 4 can handle, for example, up to 255 Nrouters.

The communications received by Nrouters 35, 37, 39 are processed by a series of protocol handlers 40, 42, 44, 46. The protocol handlers 40, 42, 44, 46 communicate with the Nrouters 35, 37, 39 using X-sockets over internal network 62. Such sockets are, for example, point-to-point, two-way software communications interfaces that direct the protocol handlers to access the internal network by creating a communications end-point or socket and returning a file descriptor with which to access that socket. The underlying protocol for packaging and decoding text messages sent by wireless devices and received by the gateway is Simple Mail Transport Protocol (SMTP).

An unlimited number of protocol handlers may be employed. Each protocol handler may include up to five protocol processes, which may be any combination of, for example, HP98, HP99 or HPID-4 processes. Each protocol processor may back up the other protocol processors automatically. The protocols handled by protocol handlers 40, 42, 44, 46 may specify that message storage and internal e-mail access may be handled by the UNIX standard Network File System (NFS) distributed file system from SUNSOFT, which allows data to be shared across the network regardless of the protocol. Each protocol handler maintains a database cache, i.e., a small, fast memory holding recently accessed data, to speed up internal network communications and to limit database access requests over the LAN.

Protocol handlers 40, 42, 44, 46 process information contained in user database machines, e.g., user database 48, user database backup 50, message store 52 and message store backup 54. The protocol machines communicate with the database machines using X-sockets over internal network 64. The database machines contain an interface to content addressable memory (CAM) (not shown) for updating information, e.g., user account information and status. Multiple backup machines may be used in gateway 4, each being synched automatically by sockets communications.

The user databases of the gateway 4 may be configured with a directory structure. Every user account stored in the user database has a unique identifier such as a MOBITEX® Access Number.

The results of protocols processed by protocol handlers 40, 42, 44, 46 using data from the user database machines are communicated externally to gateway 4 via network 66. An Internet mail router 58 and Internet mail router backup 60 connected to the internal network handle inbound and outbound communications traffic with an external network such as the Internet 20, as well as X-sockets traffic. If necessary, a separate X-sockets machine and backup machine (not shown) can be added. The transport protocol for communications over the Internet 20 may be, e.g., TCP/IP or TELNET for remote login.

The internal network is also connected to wireless network subsystems 63 that communicate through wireless network 6. Examples of wireless network subsystems 63 are an interactive voice response system (IVRS) that processes remote entries by a user from a touch tone telephone to query a database and obtain computerized voice responses, and a wireless paging system using an advanced XTAP protocol.

The wireless communication gateway 4 may be configured from a standard Santa Cruz Operation (SCO) UNIX system, with the web access program being Microsoft Windows NT®. The system may use both TCP/IP and UDP for communications, and hypertext markup language (HTML) may be used to support Internet web browsers, including those provided by Netscape and Microsoft. The computer language used by the gateway components may be, for example, in the C programming language, Java or HTML. The message delivery features of the present invention may be implemented in, for example, the C programming language.

The gateway 4 as configured in such a wireless communications system 10 includes a mailbox for the user of the wireless interactive device 2, e.g., in message store 52. Based on information about the user in the user database 48, the gateway 4 determines the user's wireless device type, and the gateway 4 is programmed to handle a variety of protocols for different wireless devices. The gateway 4 can access profile information, such as user preferences, for the user stored in the user database 48. The gateway 4 also uses information in the user database 48 to ensure that the user is a valid subscriber to the wireless service and to maintain billing information based on usage. The gateway 4 performs the function of managing the amount of data flow in the internal network and the volume of communications traffic over the wireless network 10, which has a limited bandwidth and which handles limited-sized data packets.

In operation, the gateway 4 provides remote e-mail retrieval services to a subscriber to the gateway 4 by way of a standard wireless mail package, for example. The subscriber (e.g., user) to the gateway 4 can use wireless devices 2 such as pagers to transmit e-mail retrieval request messages to the gateway 4 and receive a list of messages from the subscriber's remote e-mail accounts from the gateway 4 without developing their own POP or IMAP interfaces. The request sent from the gateway 4 to the subscriber's remote e-mail servers includes, in one embodiment, pertinent e-mail account information such as username and password. This remote e-mail information can be stored to a cache on the gateway 4 to facilitate easier retrieval in future requests. The reply message is then returned to the subscriber's wireless device 2 in the form of an e-mail message, for example, containing a list of messages in the subscriber's remote e-mail inbox. The user, therefore, need only subscribe to the gateway 4 and need not subscribe to a separate wireless e-mail server.

The message retrieval and conversion from POP/IMAP to plain text functions can be implemented at the gateway 4 using a custom application module 56. The application module 56 may reside on the gateway 4 and carry out administrative transactions in connection with interacting with a subscriber's remote e-mail accounts. Module 56 may be implemented using hardware or software and in one embodiment resides as software on the gateway 4. Those skilled in the art will appreciate that the process described below may be implemented at any level, ranging from hardware to application software and in any appropriate physical location. For example, module 56 may be implemented as software code to be executed by the gateway 4 using any suitable computer language such as, for example, microcode, and may be stored in, for example, an electrically erasable programmable read only memory (EEPROM), or can be configured into the logic of the gateway 4. According to another embodiment, module 56 may be implemented as software code to be executed by the gateway 4 using any suitable computer language such as, for example, Java, Perl, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as a CD-ROM. The application module 56 may also be a computer, such as a workstation or a personal computer, a microprocessor, a network server, or an application specific integrated circuit.

The application 56 may contain the subscriber's remote e-mail usernames and passwords that the subscriber inputs, in one embodiment, through a graphical user interface (GUI) provided in a web browser. In another embodiment, the usernames and passwords are entered through manual inputs into the subscriber's wireless device 2. In yet another embodiment, the subscriber's usernames and passwords are stored in the user database 48 on gateway 4 and the application module 56 communicates with the user database 48 to retrieve this information. The application module 56 also communicates with the user database 48 to determine the correct message transfer protocol to the wireless device 2.

In one embodiment, the application module 56 functions autonomously. The application module 56, at specified intervals, polls the subscriber's remote e-mail servers for new mail. If the server contains new or unread mail, the application module 56 requests all new messages from the remote mail server and receives the messages in a standard message format such as POP or IMAP via the Internet 20. The messages are stored in the message store databases 52 and 54 via mail routers 58 and 60. The messages are then converted by the application 56 from a standard mail receipt format such as POP or IMAP to a format capable of transmission over the wireless gateway 4 such as Blackberry or HP98, for example.

Turning now to FIG. 4, where one embodiment of the functions available to a user of the present system is illustrated. A user provides a request 12, which may include remote e-mail account information, from the wireless device 2 to the interactive wireless system 10. The system 10 transmits the request 12 as described above. Upon receipt of the desired message list by the system 10, the message list is converted by the system 10 into a format capable of viewing on the wireless device 2 and transmitted in the form of a reply 14 to the request 12. In one embodiment of the present invention, a user can view a list of messages 70, request that the system 10 retrieve the full text of a specific message designated by the user 72, forward messages 74, or delete messages 76. The forward message command 74 would require, in one embodiment, the user to input the forwarding e-mail address.

Turning now to FIG. 5, examples of graphical user interfaces (GUI's) of configuration screens for the gateway 4 are illustrated. GUI's for configuring a POP account server 80 and an IMAP account server 100 are illustrated. The application module 56 requires, in one embodiment, the POP or IMAP server name 82, 102, the POP/IMAP username 84, 104, the POP/IMAP user password 86, 106, the server timeout 88, 108 and the port number 90, 110.

Turning now to FIG. 6, a flow diagram 200 shows how the remote e-mail retrieval may be implemented according to one embodiment of the present invention. At block 172 a wireless user, using wireless device 2, requests that the interactive wireless system retrieve remote e-mail messages. The request is received by the gateway 4 at block 174 and the gateway 4 routes the request to the application module 56, which then converts the plain text request into a POP/IMAP retrieval message at block 176. In block 178 the converted request is sent via the Internet 20 to the specified remote mail server. In block 180 the remote server is accessed and the list of messages is then sent back to the interactive wireless system in POP/IMAP format. In block 182, the gateway 4 receives the message list from the remote server and delivers the message list to the application module 56. In block 184 the application module 56 converts the POP/IMAP message list to plain text for viewing on the wireless device 2. The application module 56 then delivers the converted message to the gateway 4 for transmission to the wireless device 2 via the wireless network 6 in block 186. In block 188 the message list is displayed on the wireless device 2.

In another embodiment, the request in block 172 is generated at a preprogrammed interval by the application module 56 and no input by the wireless user is required.

The term "computer-readable medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention.

The invention claimed is:

1. An apparatus for retrieving electronic mail messages via a wireless network, the apparatus comprising:
a gateway for sending an electronic mail retrieval reply message to a wireless device in response to receiving an electronic mail retrieval request message from a router utilizing a socket from the wireless device; and
an application module, the application module having computer readable instructions, wherein the computer readable instructions convert the retrieval request message into a format capable of transmission over an external computer network and the computer readable instructions convert the retrieval reply message into a format capable of transmission over a wireless network.

2. The apparatus of claim 1, wherein the request message includes remote electronic mail account information.

3. The apparatus of claim 2, wherein the electronic mail account information includes a username.

4. The apparatus of claim 2, wherein the electronic mail account information includes a password.

5. The apparatus of claim 2, wherein the electronic mail account information includes an identifier associated with an electronic mail account.

6. The apparatus of claim 1, wherein the gateway comprises a database for storing the electronic mail retrieval reply message.

7. The apparatus of claim 6, wherein the database has a directory structure for associating the wireless device with the electronic mail retrieval reply message.

8. The apparatus of claim 1, further comprising a remote electronic mail server in communication with the gateway.

9. The apparatus of claim 1, wherein the external network includes the Internet.

10. The apparatus of claim 1, wherein the electronic mail retrieval request message is a text message.

11. The apparatus of claim 1, wherein the electronic mail retrieval reply message is a text message.

12. The apparatus of claim 1, wherein the electronic mail retrieval reply message is sent via e-mail to the wireless device.

13. The apparatus of claim 1, wherein the wireless device is a pager.

14. The apparatus of claim 1, wherein the wireless device is interfaced to a keypad.

15. The apparatus of claim 1, wherein the electronic mail retrieval reply message contains a list of e-mail messages from a remote electronic mail server.

* * * * *